No. 794,644.

Patented July 11, 1905.

UNITED STATES PATENT OFFICE.

FREDERIC J. SMITH, OF ELIZABETH, NEW JERSEY, ASSIGNOR TO AMERICAN AGRICULTURAL CHEMICAL COMPANY, OF NEW YORK, N. Y.

FUNGICIDE AND METHOD OF MAKING SAME.

SPECIFICATION forming part of Letters Patent No. 794,644, dated July 11, 1905.

Application filed February 26, 1903. Serial No. 145,298.

*To all whom it may concern:*

Be it known that I, FREDERIC J. SMITH, of Elizabeth, in the county of Union, and in the State of New Jersey, have invented a certain new and useful Improvement in Fungicides and Methods of Producing the Same; and I do hereby declare that the following is a full, clear, and exact description thereof.

The object of my invention has been to provide a new process for the formation of copper hydroxid, which is commonly produced for the use of what is known as "Bordeaux mixture," which latter is in extensive use by farmers and agriculturists as a fungicide for the prevention and eradication of plant diseases.

The object of my invention has also been to provide an improved mixture or compound for the above-stated purpose, one element of which can be used alone for the said purpose; and to such ends my invention consists in the process of preparing a fungicide and in the fungicide hereinafter specified.

Previous to my invention, so far as I am aware, only a soluble salt of copper has been used for the preparation of the copper hydroxid in the Bordeaux mixture, such salt being the sulfate of copper, the copper hydroxid being precipitated from a solution of the said sulfate of copper when a slight excess of milk of lime or caustic soda is added to such solution. The solution containing the copper hydroxid has then been diluted with water to the desired strength and has been applied with a suitable spraying apparatus to the foliage of the plants. In order to avoid the use of spraying-machines for low-growing crops, such machines being expensive, and in order to avoid the labor involved in the preparation of the Bordeaux mixture as above described, which preparation in the hands of one not accustomed to such work is apt to be inaccurately done, at least so as not to produce the best results, many attempts have been made to precipitate the copper hydroxid in large quantities, to filter the same, and dry the resulting product by artificial heat, so that the copper hydroxid could be sold to the consumer in condition for use by simple mixing with water. As copper hydroxid cannot be dried by artificial heat without decomposition under such conditions and since drying the copper hydroxid by air at ordinary temperatures is too slow to be practicable, such processes have not been commercially successful. It is also impracticable to apply to the plants as a powder a mixture of soluble salts of copper and dry lime, because of the corrosive action of the former, and such mixture cannot be prepared by the manufacturer and shipped to the consumer, because it deteriorates.

My invention obviates the above-stated objections, and I provide a compound which can be successfully applied as a fungicide directly to the plants or fruit in the form of a powder and without the use of expensive apparatus and can be shipped by the manufacturer mixed in the proper proportions. One element of such compound can be successfully used by itself as a fungicide.

By my invention I replace the soluble salt of copper for making the Bordeaux mixture with an insoluble salt or compound of copper which can be acted upon by lime or other caustic substance, which produces copper hydroxid after the application of a mixture to the plant or fruit. The salt or compound of copper which I prefer is that known as "cupric phosphate," ($Cu_3P_2O_8$,) which salt is useful of itself as a fungicide. This salt in dry comminuted form can be applied to the foliage of plants or to fruits either alone or it may be mixed with dry powdered water-slaked lime and either applied with a blower or the powdered material may be mixed in water and applied in any of the usual ways. When the cupric phosphate is mixed with dry water-slaked lime and applied as a powder, hydroxid of copper is formed whenever water, as in the form of dew or rain, reaches the powder, and this has the great advantage of the formation of hydroxid of copper gradually over a considerable period of time, so that a fresh portion of copper hydroxid is constantly being formed, hence yielding the fungicide in its most active state instead of changing the entire amount of copper salt to hydroxid, as heretofore, whose fungicide value deteriorates with age. The mixture of the cupric phosphate and lime in water applied in the usual way also results in the formation of a certain amount of copper hydroxid at once.

The manner in which I prefer to prepare phosphate of copper, although I contemplate using it in the above-described manner no matter how prepared, consists in dissolving blue vitriol in phosphoric acid in the proportions of one hundred pounds of blue vitriol to forty-eight pounds twelve ounces of phosphoric acid, the latter containing forty per cent. of $P_2O_5$, which is also approximately 40° Baumé. This mixture is heated in an iron kettle until all the blue vitriol is dissolved. While still hot, powdered water-slaked lime is gradually stirred into the mass in the proportion of thirty-two pounds to the above-stated quantities. When the reactions are completed, a friable pasty substance is obtained, which is then preferably dried and pulverized until the particles will pass through an eighty to one hundred mesh screen, when the resulting blue powder is mixed with dry water-slaked lime in the proportions of at least three parts of lime to four parts of the powdered copper salt. The ratio of the lime to the copper salt may, however, be increased whenever it is found desirable—as, for instance, when arsenic compounds are added.

The reactions which occur in the above-described process are as follows:

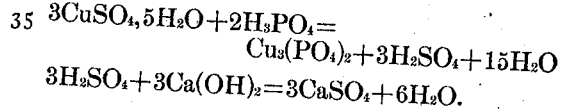

$$3CuSO_4,5H_2O + 2H_3PO_4 = Cu_3(PO_4)_2 + 3H_2SO_4 + 15H_2O$$
$$3H_2SO_4 + 3Ca(OH)_2 = 3CaSO_4 + 6H_2O.$$

An insecticide can, if desired, be added to the above-described fungicide and the plants thus by a single compound be protected both from plant-diseases and insects. For such purpose I prefer to use arsenate of lime, and the combination thus produced is a highly-desirable one. Arsenic in solution has a corrosive action both on animal and vegetable matter, and although it is highly desirable to protect plants from insects a form of arsenic which is soluble in water cannot, therefore, be applied to the plants; but by the use in my fungicide of an excess of hydrated lime any arsenic compounds introduced into the mixture are rendered insoluble, since such compounds with hydrated lime are not soluble in an alkaline solution. Injury to the plant is thus prevented, while the digestive fluids of the alimentary canal of an insect readily renders the arsenic an active poison.

Having thus described my invention, what I claim is—

1. The method of preparing a fungicide which consists in reacting upon a soluble salt of copper with phosphoric acid and neutralizing the product.

2. The method of preparing a fungicide which consists in reacting upon copper sulfate with phosphoric acid and neutralizing the product.

3. The method of preparing a fungicide which consists in reacting upon copper sulfate with phosphoric acid and neutralizing the product by lime.

4. The method of preparing a fungicide which consists in reacting upon copper sulfate with phosphoric acid neutralizing the product and drying and pulverizing the resultant neutralized product.

5. The method of preparing a composition for treating plants, which consists in reacting upon copper sulfate with phosphoric acid, neutralizing the product by lime and adding an insecticide.

6. The method of preparing a composition for treating plants, which consists in reacting upon copper sulfate with phosphoric acid, neutralizing the product by lime and adding calcium arsenate.

7. An improved fungicide and insecticide, containing copper phosphate, calcium sulfate and calcium arsenate.

8. An improved fungicide and insecticide, containing copper phosphate, calcium sulfate, calcium arsenate and slaked lime.

In testimony that I claim the foregoing I have hereunto set my hand.

FREDERIC J. SMITH.

Witnesses:
HENRY J. MILLER,
H. N. F. MILLER.